United States Patent
Chueh et al.

(10) Patent No.: US 8,971,251 B2
(45) Date of Patent: Mar. 3, 2015

(54) METHOD FOR PERFORMING WIRELESS CONNECTION CONTROL, AND ASSOCIATED APPARATUS AND ASSOCIATED COMPUTER PROGRAM PRODUCT

(71) Applicant: HTC Corporation, Taoyuan County (TW)

(72) Inventors: Hsin-Ti Chueh, Taoyuan County (TW); Chia-Wei Chen, Taoyuan County (TW); Duan-Ruei Shiu, Taoyuan County (TW); Ming-Han Tsai, Taoyuan County (TW); Cheng-Yi Ni, Taoyuan County (TW); Fu-Sheng Yu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 109 days.

(21) Appl. No.: 13/669,382

(22) Filed: Nov. 5, 2012

(65) Prior Publication Data
US 2013/0176955 A1 Jul. 11, 2013

Related U.S. Application Data

(60) Provisional application No. 61/584,318, filed on Jan. 9, 2012.

(51) Int. Cl.
*H04W 4/00* (2009.01)
*H04B 7/00* (2006.01)

(52) U.S. Cl.
USPC .......................................... 370/328; 455/500

(58) Field of Classification Search
None
See application file for complete search history.

(56) References Cited

U.S. PATENT DOCUMENTS

| 2008/0240017 | A1* | 10/2008 | Kaidar et al. | 370/328 |
| 2008/0298333 | A1* | 12/2008 | Seok | 370/338 |
| 2010/0177756 | A1* | 7/2010 | Choi et al. | 370/338 |
| 2010/0265928 | A1* | 10/2010 | Peng et al. | 370/338 |

(Continued)

FOREIGN PATENT DOCUMENTS

WO 2011093576 A1 8/2011

OTHER PUBLICATIONS

Office action mailed on Aug. 21, 2013 for the European application No. 13000080.5, filing date Jan. 9, 2013, cover pager + pp. 1-7.

(Continued)

*Primary Examiner* — Clemence Han
(74) *Attorney, Agent, or Firm* — Winston Hsu; Scott Margo

(57) ABSTRACT

A method and an apparatus for performing wireless connection control are provided. For example, the method can be applied to a first electronic device, and the method may include the steps of: adding specific information into at least one packet while establishing a wireless connection between the first electronic device and a second electronic device, where the specific information indicates a channel that the first electronic device is working on; transmitting the at least one packet carrying the specific information to the second electronic device; and performing handshaking to complete the establishment of the wireless connection with respect to the second electronic device. In another example, the method can be applied to the second electronic device, and the method may include the steps of: receiving from the first electronic device the at least one packet carrying the specific information; and performing handshaking to complete the establishment of the wireless connection.

23 Claims, 6 Drawing Sheets

(56) References Cited

U.S. PATENT DOCUMENTS

| | | | |
|---|---|---|---|
| 2011/0075589 A1* | 3/2011 | Bradley et al. | 370/254 |
| 2011/0161697 A1* | 6/2011 | Qi et al. | 713/320 |
| 2011/0194489 A1* | 8/2011 | Itaya et al. | 370/328 |
| 2011/0199980 A1* | 8/2011 | Denteneer | 370/328 |
| 2011/0211219 A1* | 9/2011 | Bradley et al. | 358/1.15 |
| 2011/0274098 A1* | 11/2011 | Jung et al. | 370/338 |
| 2012/0122501 A1* | 5/2012 | Lai | 455/500 |

OTHER PUBLICATIONS

European patent application No. 13000080.5, European application filed: Jan. 9. 2013, European Search Report mailing date: Aug. 12, 2013.

Office action mailed on Apr. 2, 2014 for the European application No. 13000080.5, p. 1-11.

Wi-Fi Alliance Confidential, "Wi-Fi Protected Setup Specification", Version 1.0h, Dec. 2006, XP055031152, p. 1-110.

* cited by examiner

METHOD FOR PERFORMING WIRELESS CONNECTION CONTROL, AND ASSOCIATED APPARATUS AND ASSOCIATED COMPUTER PROGRAM PRODUCT

CROSS REFERENCE TO RELATED APPLICATIONS

This application claims the benefit of U.S. Provisional Application No. 61/584,318, which was filed on Jan. 9, 2012 and is entitled "Easy and Fast Method to Establish a Secure Wi-Fi Link between two wireless devices", and is included herein by reference.

BACKGROUND OF THE INVENTION

1. Field of the Invention

The present invention relates to establishing a secure Wireless-Fidelity (Wi-Fi) link between two wireless devices, and more particularly, to a method for performing wireless connection control, and to an associated apparatus and an associated computer program product.

2. Description of the Prior Art

A conventional portable electronic device implemented according to the related art, such as a multifunctional mobile phone equipped with personal digital assistant (PDA) functionalities or a PDA equipped with mobile phone functionalities, may have become an important part of everyday life since it is very helpful. In a situation where establishing a wireless connection between the conventional portable electronic device and another wireless device is required, some problems may occur. For example, during establishing the wireless connection, there may be at least two full channel scan operations in the whole procedure, which may cause the configuration time to be too long. In another example, the user may need to manually start the procedure of establishing the wireless connection on both sides of the wireless connection. Thus, a novel method is required for providing connection control over an external device of an electronic device.

SUMMARY OF THE INVENTION

It is therefore an objective of the claimed invention to provide a method for performing wireless connection control, and to provide an associated apparatus and an associated computer program product, in order to solve the above-mentioned problems.

According to at least one preferred embodiment, a method for performing wireless connection control is provided, where the method is applied to a first electronic device. The method comprises the steps of: adding specific information into at least one packet while establishing a wireless connection between the first electronic device and a second electronic device, wherein the specific information indicates a channel that the first electronic device is working on; transmitting the at least one packet carrying the specific information to the second electronic device; and performing handshaking to complete the establishment of the wireless connection with respect to the second electronic device.

According to at least one preferred embodiment, an apparatus for performing wireless connection control is also provided, where the apparatus comprises at least one portion of a first electronic device. The apparatus comprises a wireless control circuit and a processing circuit. The wireless control circuit is arranged to perform wireless communication control for the first electronic device. In addition, the processing circuit is arranged to control operations of the first electronic device and to add specific information into at least one packet while establishing a wireless connection between the first electronic device and a second electronic device, wherein the specific information indicates a channel that the first electronic device is working on. Additionally, by utilizing the wireless control circuit, the processing circuit transmits the at least one packet carrying the specific information to the second electronic device and performs handshaking to complete the establishment of the wireless connection with respect to the second electronic device.

According to at least one preferred embodiment, a computer program product is also provided, where the computer program product has program instructions for instructing a processor to perform a method comprising the steps of: adding specific information into at least one packet while establishing a wireless connection between a first electronic device comprising the processor and a second electronic device, wherein the specific information indicates a channel that the first electronic device is working on; transmitting the at least one packet carrying the specific information to the second electronic device; and performing handshaking to complete the establishment of the wireless connection with respect to the second electronic device.

According to at least one preferred embodiment, a method for performing wireless connection control is provided, where the method is applied to a second electronic device. The method comprises the steps of: receiving from a first electronic device at least one packet carrying specific information, wherein the specific information is added into the at least one packet by the first electronic device while establishing a wireless connection between the first electronic device and the second electronic device, and the specific information indicates a channel that the first electronic device is working on; and performing handshaking to complete the establishment of the wireless connection with respect to the first electronic device according to the received specific information, without triggering any full channel scan of the second electronic device.

According to at least one preferred embodiment, an apparatus for performing wireless connection control is also provided, where the apparatus comprises at least one portion of a second electronic device. The apparatus comprises a wireless control circuit and a processing circuit. The wireless control circuit is arranged to perform wireless communication control for the second electronic device. In addition, the processing circuit is arranged to control operations of the second electronic device and to establish a wireless connection between a first electronic device and the second electronic device. More particularly, the processing circuit receives, by utilizing the wireless control circuit, from the first electronic device at least one packet carrying specific information, wherein the specific information is added into the at least one packet by the first electronic device while establishing the wireless connection, and the specific information indicates a channel that the first electronic device is working on. Additionally, the processing circuit performs handshaking to complete the establishment of the wireless connection with respect to the first electronic device according to the received specific information, without triggering any full channel scan of the second electronic device.

It is an advantage of the present invention that the aforementioned method, the aforementioned apparatus, and the aforementioned computer program product allow the user(s) of the electronic device(s) (e.g. the user of the first electronic device and/or the user of the second electronic device) to save time by skipping at least two full channel scan operations in the whole procedure of establishing the wireless connection without introducing any side effect. In addition, the aforementioned method, the aforementioned apparatus, and the aforementioned computer program product can automatically perform operations of the procedure of establishing the wireless connection, allowing the user(s) of the electronic device(s) (e.g. the user of the first electronic device and/or the user of the second electronic device) to use the electronic device(s) easily, where the time of manually starting the procedure of establishing the wireless connection on one or both sides of the wireless connection can be saved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
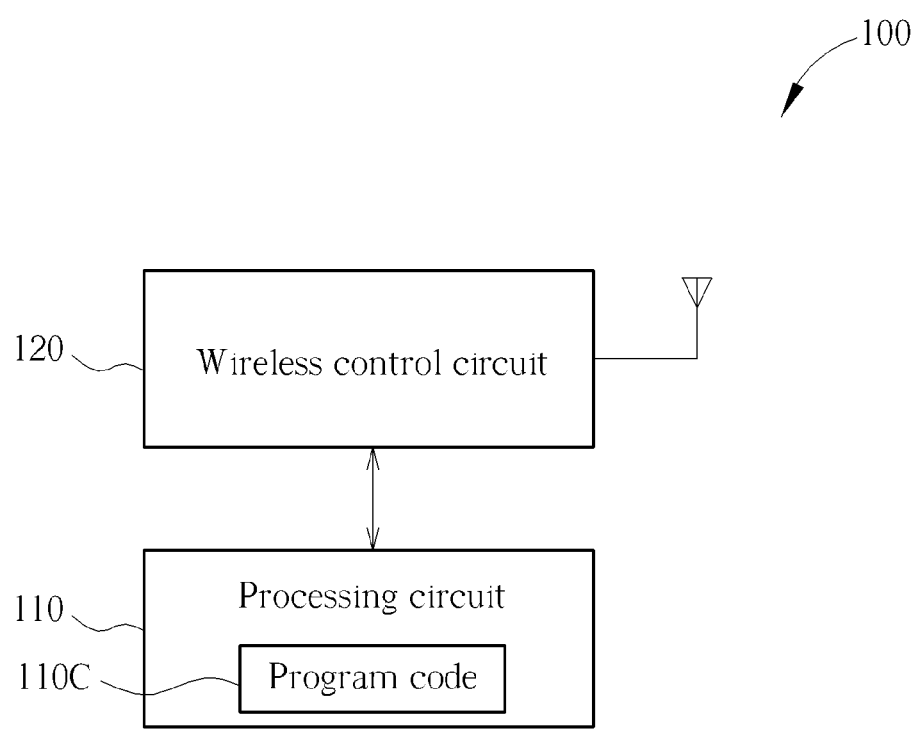
FIG. 1 is a diagram of an apparatus for performing wireless connection control according to an example.

FIG. 1 is a diagram of an apparatus 100 for performing wireless connection control, where the apparatus 100 may comprise at least one portion (e.g. a portion or all) of an electronic device. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. Examples of the electronic device may include, but not limited to, a mobile phone (e.g. a multifunctional mobile phone), a mobile computer (e.g. tablet computer), a personal digital assistant (PDA), and a personal computer such as a laptop computer or desktop computer.

As shown in FIG. 1, the apparatus 100 comprises a processing circuit 110 and a wireless control circuit 120, which is typically coupled to an antenna such as that shown in FIG. 1, where the processing circuit 110 is arranged to control operations of the electronic device, and the wireless control circuit 120 is arranged to perform wireless communication control for the electronic device. In practice, the wireless control circuit 120 may comprise some hardware component(s) for wirelessly transmitting or receiving signals for the apparatus 100. According to different examples, the hardware components within the wireless control circuit 120 may comprise at least one amplifier, at least one mixer, at least one oscillator, at least one modulator, and/or at least one demodulator. Please note that the processing circuit 110 can be selectively implemented with the mixed scheme utilizing software (or firmware) module running on hardware circuit(s), or implemented with the pure hardware scheme. For example, the processing circuit 110 may comprise a processor and associated hardware circuits implemented by using at least one printed circuit board (PCB) on which the processor can be installed, and the aforementioned associated hardware circuit may comprise at least one memory (not shown) such as at least one random access memory (RAM) and/or at least one non-volatile memory (e.g. an electrically erasable programmable read only memory (EEPROM) or a Flash memory), where at least one program code 110C (e.g. one or more sets of program codes) may be stored in the aforementioned storage unit in advance and retrieved by the processing circuit 110 (more particularly, the processor mentioned above), for running on the processing circuit 110 as illustrated in FIG. 1. This is for illustrative purposes only, and is not meant to be a limitation. In another example, the processing circuit 110 may be implemented as pure hardware circuit(s), where the aforementioned program code 110C is imbedded therein.

For better comprehension, a first electronic device such as a device A can be taken as an example of the aforementioned electronic device and a second electronic device such as a device B can be taken as another example of the aforementioned electronic device, where the apparatus 100 corresponding to the example of the first electronic device such as the device A may comprise at least one portion (e.g. a portion or all) of the first electronic device such as the device A, while the apparatus 100 corresponding to the example of the second electronic device such as the device B may comprise at least one portion (e.g. a portion or all) of the second electronic device such as the device B. Please note that the processing circuit 110 in the example of the first electronic device such as the device A and the processing circuit 110 in the example of the second electronic device such as the device B can be selectively implemented with the same scheme (e.g. one of the aforementioned mixed scheme and the aforementioned pure hardware scheme) or implemented with different schemes (e.g. different schemes selected from the aforementioned mixed scheme and the aforementioned pure hardware scheme, such as the mixed scheme and the pure hardware scheme, respectively, or the pure hardware scheme and the mixed scheme, respectively).

For example, regarding the first electronic device such as the device A, the wireless control circuit 120 in the first electronic device is capable of performing wireless communication control for the first electronic device. In addition, the processing circuit 110 in the first electronic device is capable of controlling operations of the first electronic device and adding specific information into at least one packet while establishing a wireless connection between the first electronic device and the second electronic device, such as a Wireless-Fidelity (Wi-Fi) connection, where the specific information may indicate a channel that the first electronic device is working on. Additionally, by utilizing the wireless control circuit 120 in the first electronic device, the processing circuit 110 in the first electronic device is capable of transmitting the aforementioned at least one packet carrying the specific information to the second electronic device and performing handshaking to complete the establishment of the wireless connection with respect to the second electronic device.

Regarding the second electronic device such as the device B, the wireless control circuit 120 in the second electronic device is capable of performing wireless communication control for the second electronic device. In addition, the processing circuit 110 in the second electronic device is capable of controlling operations of the second electronic device and establishing a wireless connection between the first electronic device and the second electronic device, such as the wireless connection mentioned above. More particularly, the processing circuit 110 in the second electronic device is capable of receiving, by utilizing the wireless control circuit 120 in the second electronic device, from the first electronic device at least one packet carrying specific information, such as the aforementioned at least one packet carrying the specific information mentioned above, where the specific information may be added into the aforementioned at least one packet by the first electronic device while establishing the wireless connection, and the specific information may indicate a channel that the first electronic device is working on, such as the aforementioned channel that the first electronic device is working on. Additionally, the processing circuit 110 in the second electronic device is capable of performing handshaking to complete the establishment of the wireless connection with respect to the first electronic device according to the received specific information, without triggering any full channel scan of the second electronic device.

In practice, regarding the wireless connection mentioned above, the first electronic device such as the device A may play the role of access point (AP), and the second electronic device such as the device B may play the roles of AP and station (STA) at the same time. This is for illustrative purposes only, and is not meant to be a limitation. In another example, regarding the wireless connection, the first electronic device such as the device A may play the role of AP, and the second electronic device such as the device B may play the role of STA.

Figure 2:
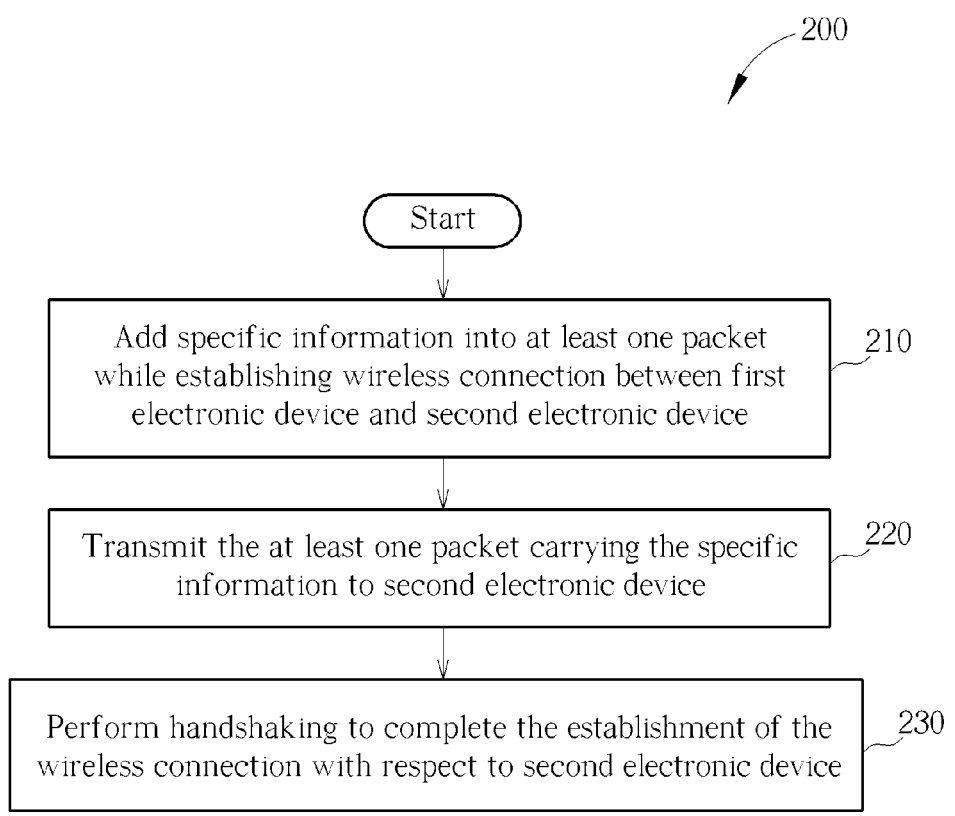
FIG. 2 illustrates a flowchart of a method for performing wireless connection control according to an example.

FIG. 2 illustrates a flowchart of a method 200 for performing wireless connection control according to an example. The method shown in FIG. 2 can be applied to the apparatus 100 shown in FIG. 1 (more particularly, the apparatus 100 corresponding to the example of the first electronic device such as the device A), and can be applied to the processing circuit 110 thereof (more particularly, the processing circuit 110 executing the program code 110C mentioned above within the example of the first electronic device such as the device A). For example, the program code 110C may be provided through a computer program product having program instructions for instructing a processor such as that mentioned above to perform the method 200 shown in FIG. 2, where the computer program product may be implemented as a non-transitory computer-readable medium (e.g. a floppy disk or a compact disc-read only memory (CD-ROM)) storing the program instructions or an equivalent version thereof, such as a software package for being installed. The method is described as follows.

In Step 210, the processing circuit 110 in the first electronic device (e.g. the device A) adds the specific information into the aforementioned at least one packet while establishing the wireless connection between the first electronic device and the second electronic device (e.g. the device B), where the specific information indicates the channel that the first electronic device is working on.

In Step 220, by utilizing the wireless control circuit 120 in the first electronic device, the processing circuit 110 in the first electronic device transmits the aforementioned at least one packet carrying the specific information to the second electronic device.

In Step 230, by utilizing the wireless control circuit 120 in the first electronic device, the processing circuit 110 in the first electronic device performs handshaking to complete the establishment of the wireless connection with respect to the second electronic device. For example, the handshaking mentioned in Step 230 may comprise Wi-Fi Protected Setup (WPS) handshaking According to this example, in addition to the channel information representing the channel that the first electronic device is working (e.g. the channel number of the channel under consideration) the specific information may further comprise other information. For example, the specific information may further comprise notification information to instruct the second electronic device to skip full channel scan for the first electronic device. In another example, the specific information may further comprise AP information of an AP that is wirelessly connected to the first electronic device. In another example, in a situation where the first electronic device is equipped with an AP function for playing a role of a mobile AP, the specific information may further comprise at least one of the following information: a Service Set Identifier (SSID), a Media Access Control (MAC) address of the mobile AP, and an Internet Protocol (IP) address that the first electronic device assigns to the second electronic device.

In practice, operations regarding the aforementioned at least one packet can be implemented according to different wireless connection control schemes. For example, according to one of these wireless connection control schemes, the aforementioned at least one packet may comprise at least one portion of a probe request. In another example, according to another one of these wireless connection control schemes, the aforementioned at least one packet may comprise at least one portion of an action frame such as the IEEE 802.11 Action Frame.

Figure 3:
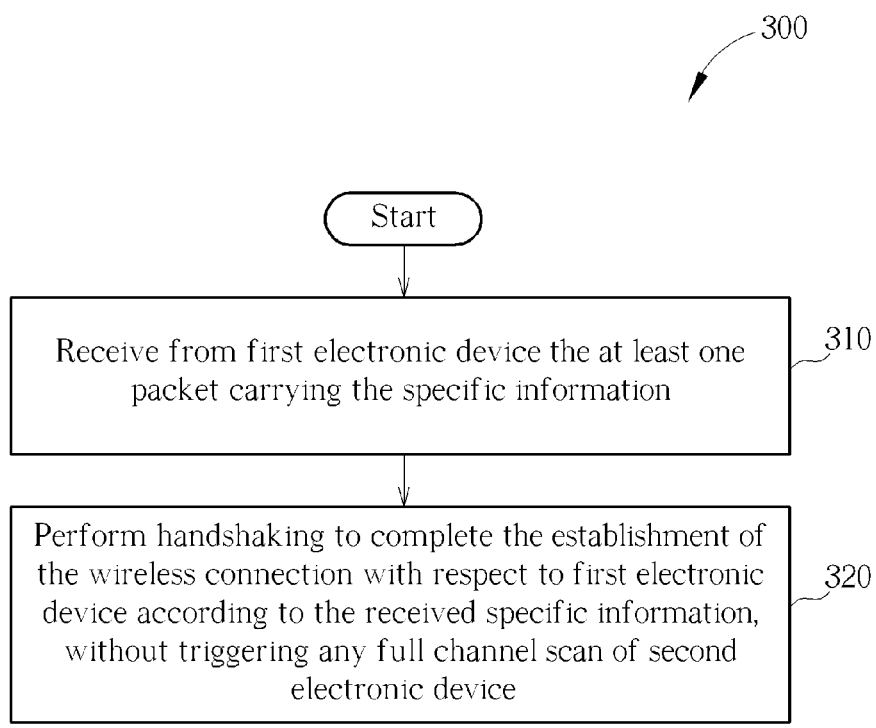
FIG. 3 illustrates a flowchart of a method for performing wireless connection control according to another example.

FIG. 3 illustrates a flowchart of a method 300 for performing wireless connection control according to another example. The method shown in FIG. 3 can be applied to the apparatus 100 shown in FIG. 1 (more particularly, the apparatus 100 corresponding to the example of the second electronic device such as the device B), and can be applied to the processing circuit 110 thereof (more particularly, the processing circuit 110 executing the program code 110C mentioned above within the example of the second electronic device such as the device B). For example, the program code 110C may be provided through a computer program product having program instructions for instructing a processor such as that mentioned above to perform the method 300 shown in FIG. 3, where the computer program product may be implemented as a non-transitory computer-readable medium (e.g. a floppy disk or a CD-ROM) storing the program instructions or an equivalent version thereof, such as a software package for being installed. The method is described as follows.

In Step 310, the processing circuit 110 in the second electronic device (e.g. the device B) receives, by utilizing the wireless control circuit 120 in the second electronic device, from the first electronic device (e.g. the device A) the aforementioned at least one packet carrying the specific information mentioned above, where the specific information is added into the aforementioned at least one packet by the first electronic device while establishing the wireless connection, and the specific information indicates the aforementioned channel that the first electronic device is working on.

In Step 320, by utilizing the wireless control circuit 120 in the second electronic device, the processing circuit 110 in the second electronic device performs handshaking to complete the establishment of the wireless connection with respect to the first electronic device according to the received specific information, without triggering any full channel scan of the second electronic device. For example, the handshaking mentioned in Step 320 may comprise the aforementioned WPS handshaking According to this example, after receiving from the first electronic device the aforementioned at least one packet carrying the specific information, the processing circuit 110 in the second electronic device may transmit, by utilizing the wireless control circuit 120 in the second electronic device, a packet carrying status information to notify the first electronic device of at least one status of the second electronic device, where the status information indicates the aforementioned at least one status of the second electronic device. For example, the status information may comprise configured/unconfigured information (i.e. configured or unconfigured information, which can be referred to as configuration information) indicating whether the second electronic device is currently connected to another device (e.g. a television (TV) such as a digital TV equipped with wireless connection functionalities, or a wireless device such as a wireless router playing the role of a Wi-Fi AP) or not. In another example, the status information may comprise AP information of an AP that is wirelessly connected to the second electronic device.

Figure 4:
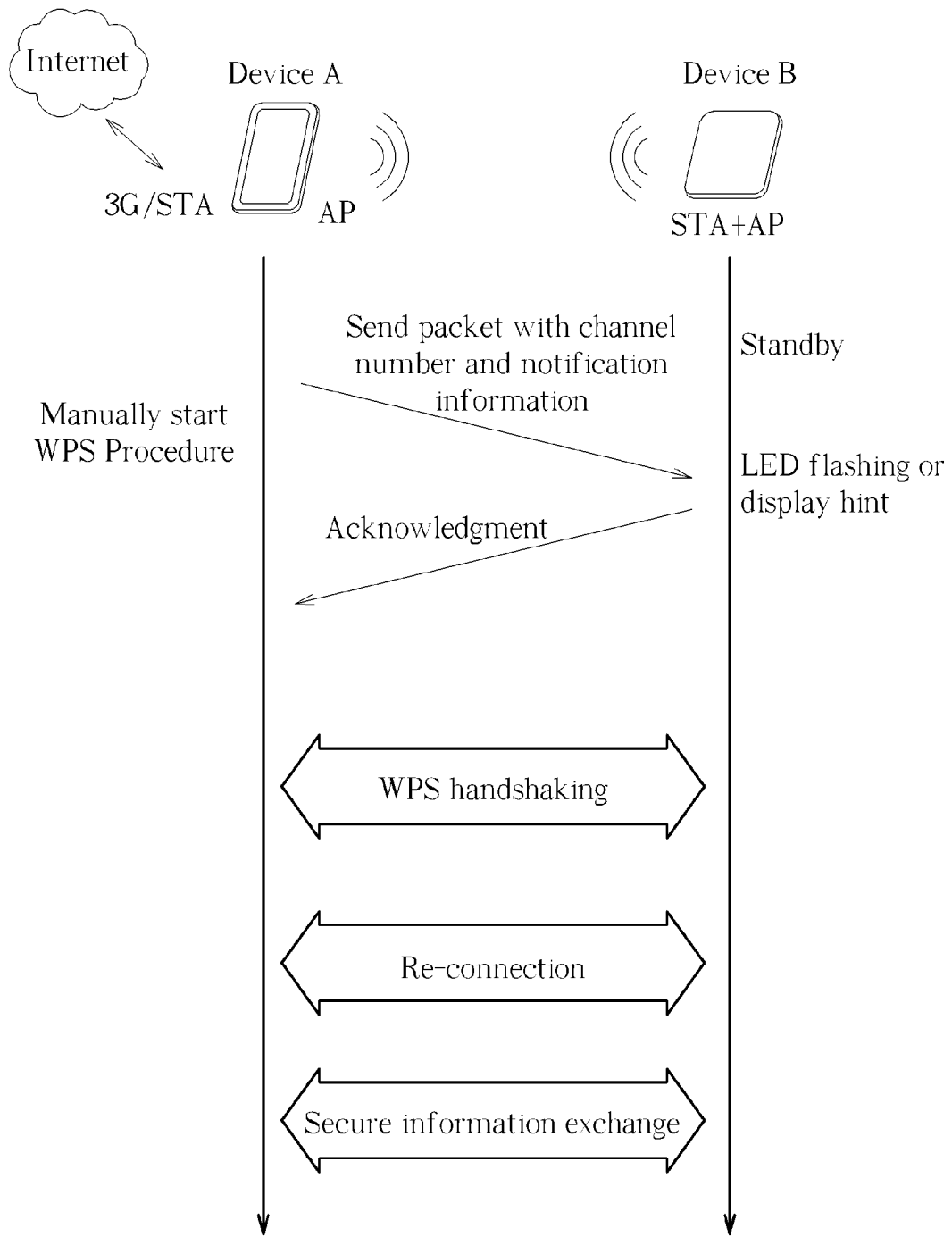
FIG. 4 illustrates a wireless connection control scheme involved with the method shown in FIG. 2 and the method shown in FIG. 3 according to an example, where the devices A and B of this example can be a mobile device and a wireless device, respectively.

FIG. 4 illustrates a wireless connection control scheme involved with the method 200 shown in FIG. 2 and the method 300 shown in FIG. 3 according to an example, where the devices A and B of this example can be a mobile device (e.g. a multifunctional mobile phone equipped with PDA functionalities or a PDA equipped with mobile phone functionalities) and a wireless device (e.g. any wireless device that can be utilized by the user of the mobile device through the mobile device mentioned above), respectively. For example, regarding the wireless connection mentioned above, the device A may play the role of AP, and the device B may play the roles of AP and STA at the same time. As shown in FIG. 4, the device A is capable of accessing the Internet through a telecommunication connection such as the $3^{rd}$ Generation (3G) connection shown in FIG. 4 (labeled "3G", for brevity), where the device A may play the role of STA when accessing the Internet through the telecommunication connection such as the 3G connection.

The procedure shown in FIG. 4, such as a WPS procedure, is quite easy for implementation and is fast, and can be described as follows:

Step S1: The user starts the configuration of a connection from the device A to a selected device in a list, such as the device B, which may depend on the preference of the user. For example, the user can select one of a plurality of devices in the list as the device for establishing the connection, such as the device B. The plurality of devices in the list may comprise some Wi-Fi devices in a neighboring region of the device A. As shown in FIG. 4, the user may touch something on a touch screen of the device A (e.g. a virtual button on the touch screen) to manually start the WPS procedure.

Step S2: The device A sends a packet with the specific field(s) including the channel number (or the channel information) and notification information, and starts the WPS registrar, where the packet with the specific field(s) including the channel number and the notification information can be taken as an example of the aforementioned at least one packet carrying the specific information.

Step S3: The device B receives the packet and replies the acknowledgment with status information such as that mentioned above. For example, the device B may notify the user of this situation by using Light Emitting Diode (LED) flashing or a display hint, depending on the implementation of the device B.

Step S4: The device B starts the standard WPS handshaking in an enrollee role in the channel under consideration such as the notified channel (e.g. the aforementioned channel that the first electronic device is working on).

Step S5: The device B re-connects to the AP of the device A in the same channel such as the notified channel (e.g. the aforementioned channel that the first electronic device is working on).

Step S6: The secure link is established and the wireless features can be started.

According to an example, such as a variation of the example shown in FIG. 4, the above procedure can be varied. For example, Step S6 can be omitted in some situation(s).

Please note that, according to some examples, such as some variations of the example shown in FIG. 4, in a situation where the IEEE 802.11 Action Frame is not supported in the device B, the device B can be a device having both of "STA" and "AP" functionalities, where the device B may play the roles of AP and STA at the same time.

According to some examples, such as some variations of the example shown in FIG. 4, the user experience can be improved and the configuration time can be saved, since the device A can play the role of AP or Wi-Fi Direct Group Owner (GO) and the device B can play any of the roles of AP (or GO) and STA (or Wi-Fi Direct Group Client). Regarding the device B, the roles of AP and STA may be enabled at the same time. Then, the device A can send the probe request with the specific field including the channel number (or the channel information) and the notification information. The channel number may indicate an IEEE 802.11 channel that the AP of the device A is currently working on. The notification information can be a command to trigger a specific action like the WPS on the device B. Before the device B is configured, it can stay in a predefined channel, where the predefined channel can be an IEEE 802.11 channel known by both sides (i.e. STA and AP). Then, the device A can also know the status (for example, if the device B has enabled the WPS) by receiving the probe response (more particularly, the probe response corresponding to the probe request) with the status information from the device B any time. If the aforementioned IEEE 802.11 Action Frame is supported, the AP of the device B can also be removed because that can be transferred between two IEEE 802.11 stations.

In some examples, such as some variations of the example shown in FIG. 4, the communication may be implemented by using the channel under consideration such as the notified channel (e.g. the aforementioned channel that the first electronic device is working on) in the whole procedure without two scan operations (more particularly, two full channel scan operations), where the notified channel can be an IEEE 802.11 channel notified by the device A.

Based upon at least one portion (e.g. a portion or all) of the examples above, establishing a secure Wi-Fi link between two wireless devices such as the devices A and B can be very fast, and the mechanism for establishing the secure Wi-Fi link between the two wireless devices such as the devices A and B can be implemented with ease, where no side effect will be introduced. In some examples, during the whole procedure, the device A can still keep the Internet access through the 3G connection or the Wi-Fi connection, where the connection is easier and faster in comparison with the related art.

Figure 5:
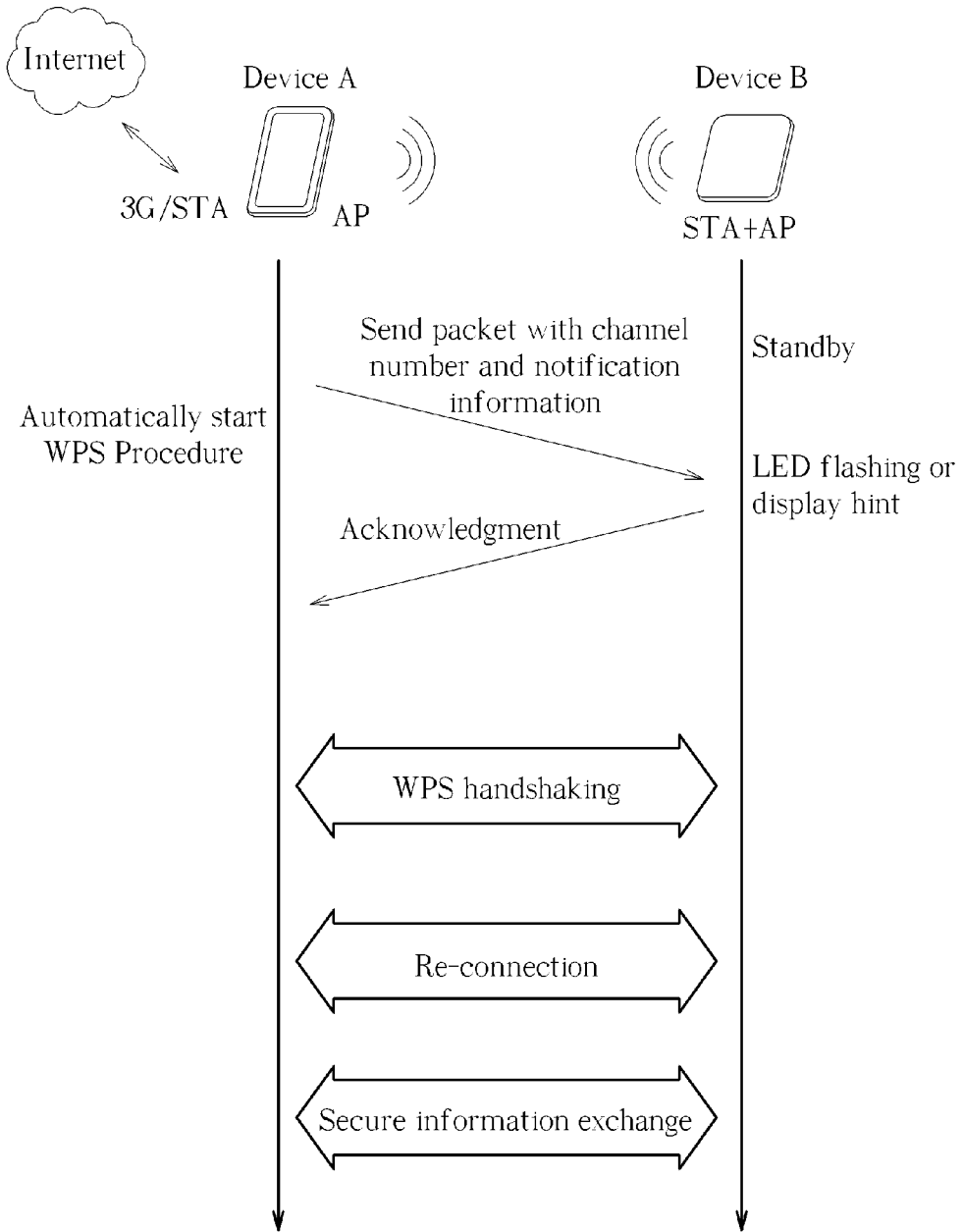
FIG. 5 illustrates a wireless connection control scheme involved with the method shown in FIG. 2 and the method shown in FIG. 3 according to another example, where the devices A and B of this example can be a mobile device and a wireless device, respectively.

FIG. 5 illustrates a wireless connection control scheme involved with the method 200 shown in FIG. 2 and the method 300 shown in FIG. 3 according to another example, where the devices A and B of this example can be a mobile device (e.g. a multifunctional mobile phone equipped with PDA functionalities or a PDA equipped with mobile phone functionalities)

and a wireless device (e.g. any wireless device that can be utilized by the user of the mobile device through the mobile device mentioned above), respectively. For example, regarding the wireless connection mentioned above, the device A may play the role of AP, and the device B may play the roles of AP and STA at the same time. As shown in FIG. 5, the device A is capable of accessing the Internet through the aforementioned telecommunication connection such as the 3G connection shown in FIG. 5 (labeled "3G", for brevity), where the device A may play the role of STA when accessing the Internet through the telecommunication connection such as the 3G connection. Please note that the apparatus 100 in the device A may automatically start the WPS Procedure. Similar descriptions are not repeated in detail for this example.

Figure 6:
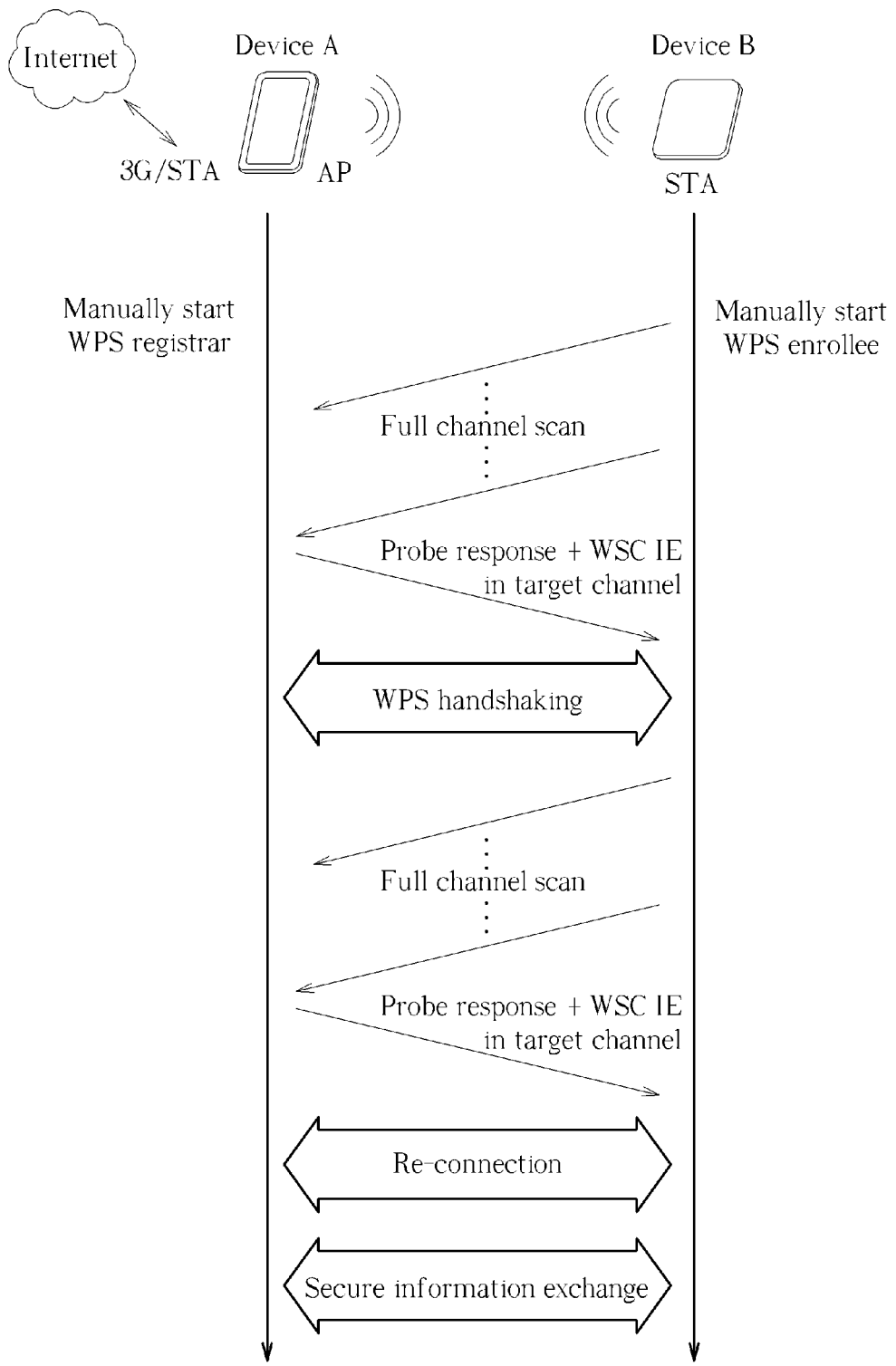
FIG. 6 illustrates a wireless connection control scheme involved with the method shown in FIG. 2 and the method shown in FIG. 3 according to another example, where the devices A and B of this example can be a mobile device and a wireless device, respectively.

FIG. 6 illustrates a wireless connection control scheme involved with the method 200 shown in FIG. 2 and the method 300 shown in FIG. 3 according to another example, where the devices A and B of this example can be a mobile device (e.g. a multifunctional mobile phone equipped with PDA functionalities or a PDA equipped with mobile phone functionalities) and a wireless device (e.g. any wireless device that can be utilized by the user of the mobile device through the mobile device mentioned above), respectively. According to this example, the mechanism for preventing the full channel scan can be temporarily disabled when needed. Thus, regarding the wireless connection, the device A may play the role of AP, and the device B may play the role of STA. As shown in FIG. 6, the device A is capable of accessing the Internet through the aforementioned telecommunication connection such as the 3G connection shown in FIG. 6 (labeled "3G", for brevity), where the device A may play the role of STA when accessing the Internet through the telecommunication connection such as the 3G connection.

Typically, before the wireless features of the conventional portable electronic device can be started, establishing the wireless connection such as a Wi-Fi link for configuration and data transfer as illustrated in FIG. 6 may be required. For example, there will be two full channel scan operations in the whole procedure, and the user may need to manually start the procedure on both sides. As shown in FIG. 6, the user may manually start the WPS registrar, and may manually start the WPS enrollee. Then, a full channel scan operation of the device B is typically triggered, and may take a period of one or more seconds (e.g. a period of 1 to 2 seconds, or a period of 6 to 10 seconds). Afterward, the device A may send a probe response with the Wi-Fi Simple Config Information Element (WSC IE) in the target channel. The WPS handshaking operation of this example can be the same as that of the example shown in FIG. 4. In addition, another full channel scan operation of the device B is typically triggered (e.g. for sharing information, in this full channel scan operation), and may take a period of one or more seconds (e.g. a period of 1 to 2 seconds, or a period of 6 to 10 seconds). Afterward, the device A may send a probe response with the WSC IE in the target channel. The re-connection operation and the secure information exchange operation of this example can be the same as those of the example shown in FIG. 4, respectively.

According to an aspect, the aforementioned computer program product of the example shown in FIG. 2 can be composed of several code segments. In addition, after these code segments are loaded into the apparatus 100 corresponding to the example of the first electronic device such as the device A (more particularly, the processing circuit 110 within the example of the first electronic device such as the device A) and are executed, the steps and features of the method shown in FIG. 2 can be implemented.

Similarly, according to an aspect such as that mentioned above, the aforementioned computer program product of the example shown in FIG. 3 can be composed of several code segments. In addition, after these code segments are loaded into the apparatus 100 corresponding to the example of the second electronic device such as the device B (more particularly, the processing circuit 110 within the example of the second electronic device such as the device B) and are executed, the steps and features of the method shown in FIG. 3 can be implemented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing wireless connection control, the method being applied to a first electronic device, the method comprising the steps of:
   adding specific information into at least one packet while establishing a wireless connection between the first electronic device and a second electronic device, wherein the specific information indicates a single channel that the first electronic device is working on;
   transmitting the at least one packet carrying the specific information to the second electronic device; and
   performing handshaking on the indicated channel to complete the establishment of the wireless connection with respect to the second electronic device.

2. The method of claim 1, wherein the handshaking comprises Wireless-Fidelity (Wi-Fi) Protected Setup (WPS) handshaking.

3. The method of claim 1, wherein the specific information further comprises notification information to instruct the second electronic device to skip full channel scan for the first electronic device.

4. The method of claim 1, wherein the specific information further comprises access point (AP) information of an AP that is wirelessly connected to the first electronic device.

5. The method of claim 1, wherein the first electronic device is equipped with an access point (AP) function for playing a role of a mobile AP; and the specific information further comprises at least one of the following information:
   a Service Set Identifier (SSID), a Media Access Control (MAC) address of the mobile AP, and an Internet Protocol (IP) address that the first electronic device assigns to the second electronic device.

6. The method of claim 1, wherein the packet comprises at least one portion of a probe request.

7. The method of claim 1, wherein the packet comprises at least one portion of an action frame.

8. An apparatus for performing wireless connection control, the apparatus comprising at least one portion of a first electronic device, the apparatus comprising:
   a wireless control circuit arranged to perform wireless communication control for the first electronic device; and
   a processing circuit arranged to control operations of the first electronic device and to add specific information into at least one packet while establishing a wireless connection between the first electronic device and a second electronic device, wherein the specific information indicates a single channel that the first electronic device is working on, wherein by utilizing the wireless control circuit, the processing circuit transmits the at least one packet carrying the specific information to the second electronic device and performs handshaking on the indicated channel to complete the establishment of the wireless connection with respect to the second electronic device.

9. The apparatus of claim 8, wherein the handshaking comprises Wireless-Fidelity (Wi-Fi) Protected Setup (WPS) handshaking.

10. The apparatus of claim 8, wherein the specific information further comprises notification information to instruct the second electronic device to skip full channel scan for the first electronic device.

11. The apparatus of claim 8, wherein the specific information further comprises access point (AP) information of an AP that is wirelessly connected to the first electronic device.

12. The apparatus of claim 8, wherein the first electronic device is equipped with an access point (AP) function for playing a role of a mobile AP; and the specific information further comprises at least one of the following information:
   a Service Set Identifier (SSID), a Media Access Control (MAC) address of the mobile AP, and an Internet Protocol (IP) address that the first electronic device assigns to the second electronic device.

13. The apparatus of claim 8, wherein the packet comprises at least one portion of a probe request.

14. The apparatus of claim 8, wherein the packet comprises at least one portion of an action frame.

15. A computer program product, having program instructions for instructing a processor to perform a method comprising the steps of:
   adding specific information into at least one packet while establishing a wireless connection between a first electronic device comprising the processor and a second electronic device, wherein the specific information indicates a single channel that the first electronic device is working on;
   transmitting the at least one packet carrying the specific information to the second electronic device; and
   performing handshaking on the indicated channel to complete the establishment of the wireless connection with respect to the second electronic device.

16. A method for performing wireless connection control, the method being applied to a second electronic device, the method comprising the steps of:
   receiving from a first electronic device at least one packet carrying specific information, wherein the specific information is added into the at least one packet by the first electronic device while establishing a wireless connection between the first electronic device and the second electronic device, and the specific information indicates a single channel that the first electronic device is working on; and
   performing handshaking on the indicated channel to complete the establishment of the wireless connection with respect to the first electronic device according to the received specific information, without triggering any full channel scan of the second electronic device.

17. The method of claim 16, further comprising:
   after receiving from the first electronic device the at least one packet carrying the specific information, transmitting a packet carrying status information to notify the first electronic device of at least one status of the second electronic device, wherein the status information indicates the at least one status of the second electronic device.

18. The method of claim 17, wherein the status information comprises configured/unconfigured information indicating whether the second electronic device is currently connected to another device or not.

19. The method of claim 17, wherein the status information comprises access point (AP) information of an AP that is wirelessly connected to the second electronic device.

20. An apparatus for performing wireless connection control, the apparatus comprising at least one portion of a second electronic device, the apparatus comprising:
   a wireless control circuit arranged to perform wireless communication control for the second electronic device; and
   a processing circuit arranged to control operations of the second electronic device and to establish a wireless connection between a first electronic device and the second electronic device, wherein the processing circuit receives, by utilizing the wireless control circuit, from the first electronic device at least one packet carrying specific information, wherein the specific information is added into the at least one packet by the first electronic device while establishing the wireless connection, and the specific information indicates a single channel that the first electronic device is working on, wherein the processing circuit performs handshaking on the indicated channel to complete the establishment of the wireless connection with respect to the first electronic device according to the received specific information, without triggering any full channel scan of the second electronic device.

21. The apparatus of claim 20, wherein after receiving from the first electronic device the at least one packet carrying the specific information, the processing circuit transmits, by utilizing the wireless control circuit, a packet carrying status information to notify the first electronic device of at least one status of the second electronic device; and the status information indicates the at least one status of the second electronic device.

22. The apparatus of claim 21, wherein the status information comprises configured/unconfigured information indicating whether the second electronic device is currently connected to another device or not.

23. The apparatus of claim 21, wherein the status information comprises access point (AP) information of an AP that is wirelessly connected to the second electronic device.

* * * * *